T. E. MURRAY, Jr.
METHOD OF ELECTRICAL BUTT WELDING.
APPLICATION FILED NOV. 9, 1917.

1,259,273.

Patented Mar. 12, 1918.

INVENTOR
Thomas E. Murray Jr.
BY
ATTORNEY

UNITED STATES PATENT OFFICE.

THOMAS E. MURRAY, JR., OF BROOKLYN, NEW YORK.

METHOD OF ELECTRICAL BUTT-WELDING.

1,259,273.  Specification of Letters Patent.  Patented Mar. 12, 1918.

Application filed November 9, 1917. Serial No. 201,012.

*To all whom it may concern:*

Be it known that I, THOMAS E. MURRAY, Jr., a citizen of the United States, residing at Brooklyn, in the county of Kings and State of New York, have invented a certain new and useful Improvement in Methods of Electrical Butt-Welding, of which the following is a specification.

The invention is a method of electrical butt-welding, wherein the bodies to be welded are each separately and independently electrically heated to render their butt ends plastic, and said butt ends while so plastic are moved into contact and pressed together to cause the desired union between them.

In the accompanying drawings—

Figure 1:
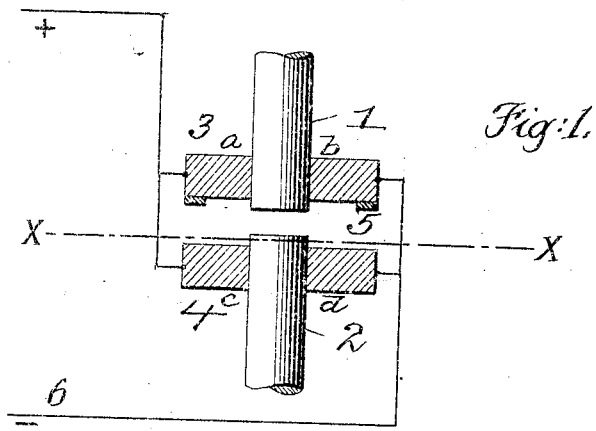
Figure 2:
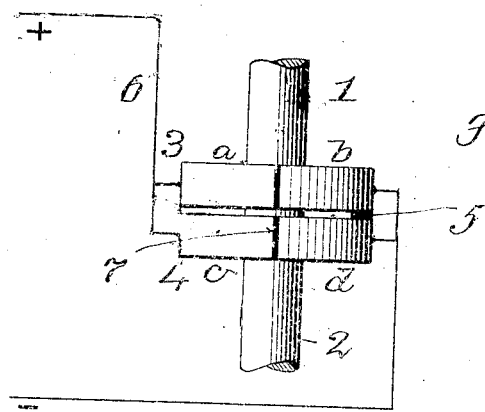
Figure 3:
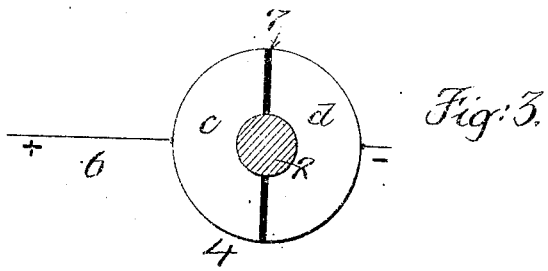

Figure 1 shows the rods to be butt-welded in elevation, and the electrodes thereon in section. Fig. 2 shows the rods and electrodes in elevation and after welding. Fig. 3 is a section on the line X, X of Fig. 1.

Similar numbers and letters of reference indicate like parts.

1 and 2 are metal rods to be butt-welded. The welding electrodes 3, 4 are here shown as respectively carried by said rods. Each electrode is formed in two substantially semi-circular sections, as $a$, $b$ and $c$, $d$, separated by a body 7 of insulating material. The butt-ends of the rods protrude beyond the electrodes. On one of the electrodes, as 3, may be secured stops 5 of insulating material. The sections $a$, $b$ of electrode 3 are connected in multiple with the sections $c$, $d$ of electrode 4.

The operation is as follows: Circuit being established, the rods 1 and 2 are separately and independently heated by the current on said circuit, and their facing butt-ends are thus rendered plastic. Said butt-ends while plastic are then brought into contact and pressed together to produce the desired union between them. The function of the stops 5 is to limit the approximation of the electrodes 3, 4, and so regulate the amount of metal taken up at the welded joint. The current may be interrupted immediately before the butt-ends of the rods come into contact, or it may be maintained after said contact has been established and during the pressing together of said ends.

I claim:

1. The method of electrical butt-welding, which consists in electrically heating each of the bodies to be joined separately and independently of one another until their butt-ends become plastic, and then moving said ends into contact and pressing them together to cause them to unite.

2. The method of electrical butt-welding, which consists in electrically heating each of the bodies to be joined separately and independently of one another until their butt-ends become plastic, then interrupting the welding current, and while said butt-ends are still plastic, moving said butt-ends into contact and pressing them together to cause them to unite.

In testimony whereof I have affixed my signature in presence of two witnesses.

THOMAS E. MURRAY, JR.

Witnesses:
GERTRUDE T. PORTER,
MAY T. McGARRY.